United States Patent
Bravi et al.

(10) Patent No.: US 11,926,318 B2
(45) Date of Patent: Mar. 12, 2024

(54) SYSTEMS AND METHODS FOR DETECTING A VULNERABLE ROAD USER IN AN ENVIRONMENT OF A VEHICLE

(71) Applicant: Verizon Connect Development Limited, Dublin (IE)

(72) Inventors: Luca Bravi, Scandicci (IT); Luca Kubin, Collecchio (IT); Leonardo Sarti, Sesto Fiorentino (IT); Leonardo Taccari, Florence (IT); Francesco Sambo, Florence (IT)

(73) Assignee: Verizon Connect Development Limited, Dublin (IE)

( * ) Notice: Subject to any disclaimer, the term of this patent is extended or adjusted under 35 U.S.C. 154(b) by 357 days.

(21) Appl. No.: 16/949,441

(22) Filed: Oct. 29, 2020

(65) Prior Publication Data

US 2022/0135027 A1 May 5, 2022

(51) Int. Cl.
*B60W 30/095* (2012.01)
*B60W 50/14* (2020.01)
*G06F 18/24* (2023.01)
*G06T 7/20* (2017.01)
*G06T 7/60* (2017.01)
(Continued)

(52) U.S. Cl.
CPC ........ *B60W 30/0956* (2013.01); *B60W 50/14* (2013.01); *G06F 18/24* (2023.01); *G06T 7/20* (2013.01); *G06T 7/60* (2013.01); *G06T 7/70* (2017.01); *G06V 20/58* (2022.01); *G08G 1/166* (2013.01); *B60W 2050/146* (2013.01); *B60W 2420/42* (2013.01); *B60W 2554/4042* (2020.02); *B60W 2554/4044* (2020.02); *G06T 2207/10016* (2013.01); *G06T 2207/30241* (2013.01); *G06T 2207/30261* (2013.01)

(58) Field of Classification Search
CPC ............ B60W 30/0956; B60W 50/14; B60W 2050/146; B60W 2420/42; B60W 2554/4042; B60W 2554/4044; G06K 9/6267; G06T 7/20; G06T 7/60; G06T 7/70; G06T 2207/10016; G06T 2207/30241; G06T 2207/30261; G06V 20/58; G08G 1/166
See application file for complete search history.

(56) References Cited

U.S. PATENT DOCUMENTS 11,061,398 B2 * 7/2021 Levinson .............. G01S 7/4972
11,126,197 B2 * 9/2021 Chen .................... G05D 1/0088
(Continued)

*Primary Examiner* — Ig T An

(57) ABSTRACT

In some implementations, a device may receive video data associated with video frames that depict an environment of a vehicle. The device may identify an object depicted in the video frames, wherein an object detection model indicates bounding boxes associated with the object. The device may determine, based on the bounding boxes, a configuration of the bounding boxes within the video frames. The device may determine, based on the configuration of the bounding boxes, that the object is a vulnerable road user (VRU) that is in the environment. The device may determine a trajectory of the VRU based on a change in the configuration between video frames of a set of the video frames. The device may determine, based on the trajectory, a probability of a collision between the VRU and the vehicle. The device may perform, based on the probability, an action associated with the vehicle.

20 Claims, 6 Drawing Sheets

(51) Int. Cl.
  *G06T 7/70* (2017.01)
  *G06V 20/58* (2022.01)
  *G08G 1/16* (2006.01)

(56) References Cited

U.S. PATENT DOCUMENTS

2017/0329332 A1* 11/2017 Pilarski ............. B60W 50/0097
2021/0094539 A1* 4/2021 Beller ................. G05D 1/0221
2021/0403035 A1* 12/2021 Danna ................ B60W 60/0011

* cited by examiner

SYSTEMS AND METHODS FOR DETECTING A VULNERABLE ROAD USER IN AN ENVIRONMENT OF A VEHICLE

BACKGROUND

A dashboard camera can be mounted to a vehicle to capture video data related to the vehicle, a road the vehicle is traveling on, a path of the vehicle on the road, one or more objects on the road and/or in the path of the vehicle, and/or the like. Other sensor devices may be attached to or incorporated into the vehicle to capture data, such as a speedometer, an accelerometer, a location sensor, a steering angle sensor, and/or the like.

DETAILED DESCRIPTION OF PREFERRED EMBODIMENTS

Figure 1A:
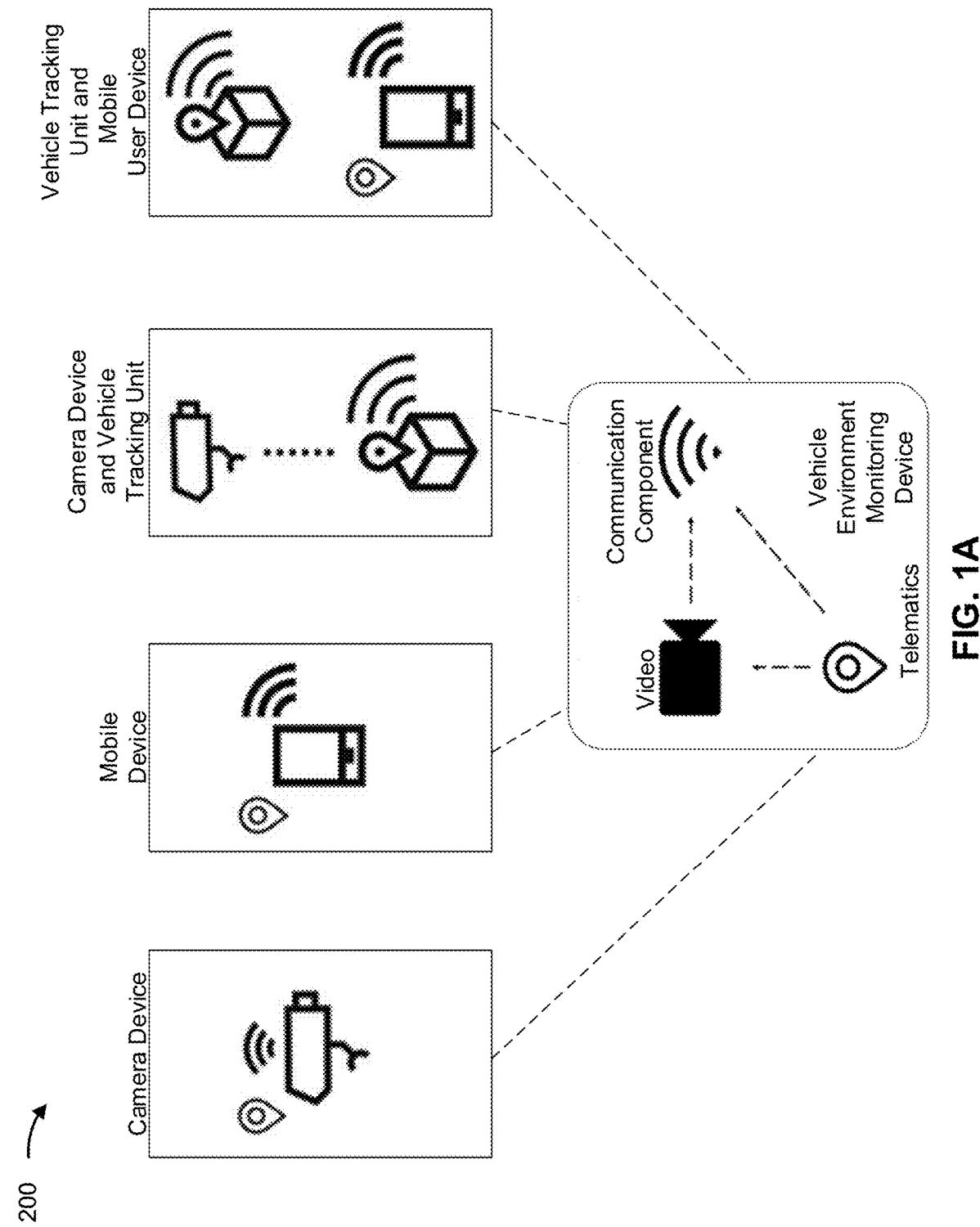
FIGS. 1A and 1B are diagrams of an example associated with detecting a vulnerable road user in an environment of a vehicle.

The following detailed description of example implementations refers to the accompanying drawings. The same reference numbers in different drawings may identify the same or similar elements.

While driving a vehicle, a driver is expected to monitor their surrounding environment to detect and avoid objects, such as other vehicles, obstructions, and/or vulnerable road users (VRUs) (e.g., pedestrians and/or cyclists) in order to prevent and minimize hazardous situations. Certain vehicles may include environment monitoring systems that include complex sensor systems (e.g., including radio detection and ranging (RADAR) systems and/or light detection and ranging (LIDAR) systems) for detecting and/or identifying such hazardous objects. While certain manufacturers and/or owners of these vehicles may spend considerable resources (e.g., hardware resources, computing resources, and/or design resources) including these complex sensor systems when manufacturing vehicles, many existing vehicles do not include such systems and adding such complex sensor systems may either be infeasible (e.g., because the vehicle is not configured to operate with such a complex sensor system) or cost prohibitive to an owner of the vehicle.

A single dashboard camera system (though more than one dashboard cameras may be used) can obtain video data regarding a driver's operation of a vehicle, which may provide valuable context to understanding a driver's driving behavior. In some cases, a dashboard camera system may comprise a forward facing camera (FFC) that captures an image of an environment of the vehicle from a point of view that corresponds to a direction of travel of the vehicle and/or a point of view of the driver. The dashboard camera system may include a user interface and/or be linked with a mobile device (e.g., a user equipment of the user) and/or an onboard system of the vehicle (e.g., that includes one or more onboard computers or control stations). Accordingly, the driver may control the dashboard camera system and/or receive alerts and/or information associated with the video data via the user interface, the user device, and/or the onboard system of the vehicle Some implementations described herein provide a vehicle environment monitoring device for a vehicle that is configured to detect and/or identify a VRU in video frames (e.g., captured or obtained by an FFC), determine trajectories of the VRU according to a configuration of the VRU in the video frames, determine a probability of a collision between the VRU and the vehicle, and perform an action based on the probability, such as alert a driver (or user) of the vehicle, notify a vehicle management system of the probability or likelihood of a collision, and/or the like. The vehicle environment monitoring device may be associated with a dashboard camera system and/or user device that can be installed and/or mounted to a dashboard of the vehicle using any suitable fastening system (e.g., an adhesive device, suction device, and/or the like). Accordingly, relative to the complex sensor systems discussed above, integration of the vehicle environment monitoring device with a vehicle, as described herein, involves less complexity with respect to the quantity of hardware and/or design of a system of the hardware of the complex sensor systems with previous vehicles, while maintaining or improving accuracy with respect to detecting a VRU, identifying a VRU, and/or alerting a driver of the vehicle that a VRU is in an environment of the vehicle and/or in danger of a collision with the vehicle. Moreover, the vehicle environment monitoring device, as described herein, provides improved scalability with respect to vehicle environment monitoring by allowing for vehicles that are not preconfigured with environment monitoring systems, thereby improving overall safety of roadways and/or travel.

Furthermore, implementations described herein are automated and may capture and process numerous (e.g., hundreds, thousands, millions, billions, and/or the like) data points to detect, identify, and/or numerous objects at the same time. This can improve speed and efficiency of the process and conserve computing resources (e.g., processor resources, memory resources, communication resources, and/or the like) of the vehicle environment monitoring device, a vehicle management system, and/or a client device associated with the vehicle environment monitoring device.

Furthermore, implementations described herein use a rigorous, computerized process to perform tasks or roles that were not previously performed or were previously performed using subjective human intuition or input. Additionally, implementations described herein conserve computing resources that would otherwise be wasted in attempting to assist a human in detecting, identifying, and/or classifying a driving event involving a VRU.

Figure 1B:
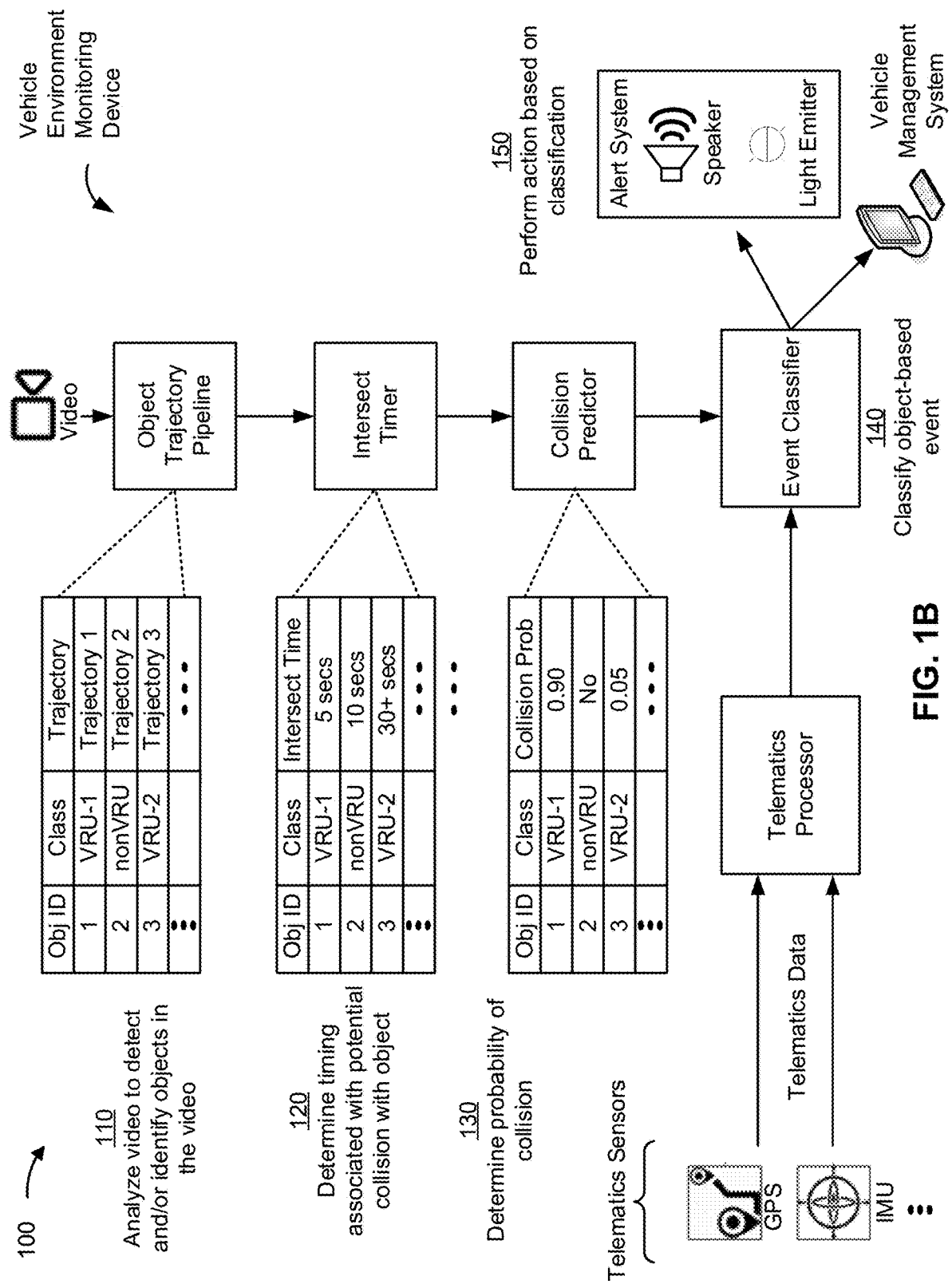

FIGS. 1A and 1B are diagrams of an example 100 associated with detecting a vulnerable road user in an environment of a vehicle. As shown in FIG. 1A, example 100 includes a vehicle environment monitoring device that can be used and/or integrated with a vehicle. The vehicle environment monitoring device, as described herein, may include a camera device, a user device, a vehicle tracking unit device, and/or a similar device that is capable of capturing data associated with an environment of the vehicle and/or associated with detecting and/or reporting driving events associated with a VRU.

In some implementations, the vehicle environment monitoring device can be mounted and/or affixed to the vehicle (e.g., on a dashboard of the vehicle, on a windshield of the vehicle, and/or the like). In some implementations, the vehicle environment monitoring device can include a camera (e.g., a dashboard camera, sometimes referred to as a "dash cam," a video camera, and/or the like). In some implementations, the vehicle environment monitoring device can be mounted and/or affixed to the vehicle such that the camera is pointed in a direction in which the vehicle is traveling. In some implementations, the camera can capture video data (e.g., record the video data and store the video data) concerning the vehicle, the trajectory of the vehicle, a road that the vehicle is traveling on, and/or one or more objects on and/or near the road (e.g., other vehicles, sign posts, guard rails, road debris, and/or VRUs). In some implementations, the video data comprises a plurality of video frames, where one video frame comprises video data information for a specific moment in time. In some implementations, the video data has a frame rate (e.g., a quantity of video frames per second). In some implementations, the vehicle environment monitoring device can include one or more cameras that are front-facing (e.g., pointed to the front of the vehicle), rear-facing (e.g., pointed to the back of the vehicle), and/or side-facing (e.g., pointed to the side of the vehicle), and/or the like.

In some implementations, the vehicle environment monitoring device can include one or more telematics sensors. A telematics sensor can include an accelerometer that collects data concerning acceleration and/or deceleration (hereinafter referred to generally as acceleration/deceleration) of the vehicle. For example, the data concerning acceleration/deceleration of the vehicle can include information concerning an acceleration/deceleration rate of the vehicle, an acceleration/deceleration direction of the vehicle, a maximum acceleration/deceleration rate of the vehicle during a period of time, a start time of the period of time, an end time of the period of time, a speed of the vehicle at the start time, a speed of the vehicle at the end time, and/or the like.

In some implementations, the telematics sensor of the vehicle environment monitoring device can include a global positioning system (GPS) sensor that collects data concerning a position of the vehicle. For example, the data concerning the position of the vehicle can include a location of the vehicle (e.g., represented as a latitude and longitude pair), a time of the location of the vehicle (e.g., when the vehicle is at the location), a direction of the vehicle (e.g., which way the vehicle is pointing, such as in degrees away from north, where north is represented by 0 degrees), a distance from a last recorded location of the vehicle, and/or the like. Correspondingly, the GPS sensor may collect data concerning the speed of the vehicle.

In some implementations, the vehicle environment monitoring device can include a communication component. In some implementations, the communication component can facilitate communication between the vehicle environment monitoring device and one or more other devices (e.g., a client device, such as a user device). In some implementations, the communication component can communicate with the one or more other devices using a wired connection, a wireless connection, or a combination of wired and wireless connections. In some implementations, the communication component can transmit the video data, the data concerning the acceleration/deceleration of the vehicle, the data concerning the position of the vehicle, and/or the like to the one or more other devices.

As an example, as shown in FIG. 1A, the vehicle can use a camera device, such as a smart dashboard camera, as the vehicle environment monitoring device, where the camera device includes the camera, the telematics sensor (which includes the accelerometer and the GPS sensor), and the communication component. As another example, the vehicle can use a mobile device, such as a user equipment, as the vehicle environment monitoring device, where the mobile device includes the camera, the telematics sensor (which includes the accelerometer and the GPS sensor), and the communication component.

In a further example, as shown in FIG. 1A, the vehicle environment monitoring device of the vehicle can comprise a camera device, such as a basic dashboard camera, and a vehicle tracking unit device, where the camera device includes the camera and the vehicle tracking unit device includes the telematics sensor (which includes the accelerometer and the GPS sensor), and the communication component. In some implementations, the vehicle tracking unit device is an internal component of the vehicle. In some implementations, the camera device and the vehicle tracking unit device can communicate with each other to share information (e.g., by a wireless and/or wired connection).

In an additional example, the vehicle environment monitoring device of the vehicle can include a vehicle tracking unit device and a mobile user device. In some implementations, the vehicle tracking unit device can include the GPS sensor and a first communication component, and the mobile user device can include the camera, the accelerometer, and a second communication component. In some implementations, the vehicle tracking unit device cannot directly communicate with the mobile user device, so the vehicle tracking unit device and the mobile user device can transmit, respectively, data to the one or more other devices via the first communication component of the vehicle tracking unit device and the second communication component of the mobile user device.

As shown in FIG. 1B, the vehicle environment monitoring device may include an object trajectory pipeline, an intersect timer, a collision predictor, a telematics processor, and an event classifier. As shown by reference number 110, the object trajectory pipeline analyzes video from the camera to detect and/or identify objects in the video. The camera may continuously capture a sliding window of video frames corresponding to a certain time period. As described herein, the camera may capture the video frames at a particular frame rate.

The object trajectory pipeline, as described herein, is configured to identify objects depicted in the video frames and based on a particular frame rate. For example, the object trajectory pipeline may include a computer vision model (e.g., an image processing model), such as an object detection model (e.g., a model configured to detect objects based on lines and/or polygons formed by and/or based on arrangements of the lines, such as a you-only-look-once (YOLO) model or other machine learning model that enables quick detection), an object identification model, and/or the like. According to some implementations, the computer vision model may be trained to identify certain types of objects that are specific to the environment (e.g., based on configurations of objects being mapped to types of objects and/or VRUs). More specifically, the computer vision model may be configured to identify roadways, lane markings, road signs, roadside objects, VRUs (or certain types of VRUs, such as pedestrians and/or cyclists), among other examples associated with an environment of a vehicle. Additionally, or alternatively, the vehicle environment monitoring device may store and/or maintain mappings of configurations of objects to particular types of objects (e.g., types of VRUs and/or non VRUs), to identify an object and/or a type of object. The vehicle environment monitoring device may store and/or maintain the mappings in an object identification data structure of the vehicle environment monitoring device.

In some implementations, object trajectory pipeline may be configured to obtain (e.g., from an object detection model) bounding boxes associated with detected objects in the environment. The object trajectory pipeline (e.g., via an object identification model) may identify certain objects (or types of objects) based on, positions, configurations and/or depictions of the objects within the video frames (and/or bounding boxes corresponding to the objects). The configurations may correspond to sizes, shapes, and/or locations of bounding boxes within the video frames. Additionally, or alternatively, the configurations may be based on the relationships between a plurality of bounding boxes that are associated with the objects. The configurations may be determined based on depictions of the objects, shapes of bounding boxes associated with the objects, and/or relationships between the bounding boxes. For example, the object trajectory pipeline may identify a pedestrian based on determining that a set of identified bounding boxes associated with the pedestrian (e.g., bounding boxes for limbs, torso, and/or head of the pedestrian) are proportionally configured, arranged, and/or shaped in a manner that corresponds to a shape or arrangement of a pedestrian.

Moreover, as described herein, the object trajectory pipeline may determine a trajectory of an identified object. For example, the object trajectory pipeline may track motion and/or movement (e.g., speed and/or direction) of an object across video frames captured by the camera. The tracked motion may be relative to movement of the object, movement of the vehicle, and/or a frame rate of the video frames. In some implementations, the object trajectory pipeline may track the motion or movement of the object based on detecting that the object is a VRU. Additionally, or alternatively, the object trajectory pipeline may ignore and/or track the motion or movement of an object that is not a VRU (which may be referred to herein as a "non-VRU") less frequently (or via fewer video frames) than when tracking VRUs (e.g., to conserve computing resources, such as processing and/or memory resources, of the vehicle environment monitoring device). In this way, the vehicle environment monitoring device may prioritize tracking of VRUs over non-VRUs (e.g., to prioritize safety of a VRU over safety of a non-VRU).

In this way, the vehicle environment monitoring device may identify and/or track VRUs within the video frames to determine whether a collision with one or more of the VRUs is possible and/or likely. An example of the object trajectory pipeline is further described herein at least in connection with FIG. 2.

As further shown in FIG. 1B, and by reference number 120, the intersect timer determines timing associated with a potential collision with objects in the environment. For example, the intersect timer may determine and/or estimate an amount of time until a particular object reaches (and/or crosses) a camera plane of the camera (e.g., a physical plane of the camera, such as a plane of a lens of the camera). In such a case, the camera plane may correspond to and/or be associated with a physical plane of the vehicle. Accordingly, as described herein, timing associated with the object reaching a camera plane, as estimated according to video frames of the camera, can correspond to the object and the vehicle being aligned within the camera plane (which may be referred to herein as an "intersect time"). In this way, as described herein, depending on the trajectory of an object (e.g., a VRU), the intersect time may correspond to timing of a potential collision between the object and the vehicle.

As described herein, the intersect timer may determine the intersect time between objects and the vehicle for each video frame of a set of video frames captured by the camera (e.g., every video frame captured by the camera and/or a subset of all video frames captured by the camera). For example, for each video frame of the set of video frames that is analyzed, the intersect timer may determine a distance between a particular object and the vehicle based on a size of the object and/or a type of the object. More specifically, based on detecting that an object is a VRU and determining the size of the VRU as depicted in the video frame, the intersect timer can estimate the distance (d) between the vehicle and the VRU according to an average physical size of the VRU (which may be a preconfigured and/or known value of the vehicle environment monitoring device). Furthermore, the intersect timer may determine the relative speed ($\Delta S$) between the vehicle and the VRU (e.g., the speed difference between the vehicle and the target). In this way, based on the distance and the relative speed, the intersect timer can estimate the time (t) for the vehicle to reach the object (or vice versa) based on the distance and the relative speed ($t = d/\Delta S$).

According to some implementations, the intersect timer determines the timing of a VRU reaching the camera plane based on the determined trajectory of the object. For example, based on a direction of travel of the VRU and/or a speed of the VRU, as determined from a change in a configuration of the VRU across a set of the video frames, the intersect timer can estimate the time and/or moment that the VRU reaches the camera plane. More specifically, the timing of the VRU reaching the camera plane may be determined based on a timestamp, a frame rate of the set of video frames, and/or a rate at which the VRU appears to change in size, as depicted across the set of video frames (e.g., the faster the object appears to become larger across a set of video frames, the sooner the object is expected to reach the camera plane).

According to some implementations, the intersect time may be representative of a severity of a potential hazardous event between an object and the vehicle. For example, the shorter the intersect time, the sooner the object and the vehicle may collide. Accordingly, in some implementations, the intersect times associated with objects may be used, by the vehicle environment monitoring device, to prioritize and/or select an order for determining/estimating a probability of a collision between the vehicle and the objects. For example, if a first VRU has a relatively shorter intersect time than a second VRU, the vehicle environment monitoring device may determine a probability of a collision occurring with the first VRU before a collision occurring the second VRU. Similarly, if a collision between the vehicle and a VRU is determined to be likely, as described herein, the intersect time may be used by the event classifier to classify the severity of a potential event, and to cause corresponding actions to be performed according to the severity (e.g., emitting or displaying louder alerts and/or more intense visual alerts for objects with a shorter intersect time than for objects with a longer intersect time).

In this way, based on the video data and/or video frames, the intersect timer may determine an amount of time until an object is expected to reach a camera plane of the camera and/or, correspondingly, an amount of time until the vehicle is expected to align with the object within a same physical plane and/or collide with the object.

As further shown in FIG. 1B, and by reference number 130, the collision predictor determines a probability of a collision between objects in the environment and the vehicle. For example, the collision predictor may determine and/or estimate a probability of a particular object (e.g., a VRU) colliding with the vehicle based on the type of the object, the intersect time associated with the object, and/or the direction of travel of the object (e.g., determined from the trajectory). As described herein, the collision predictor may prioritize determining the probability of a collision between the vehicle and certain objects based on types of the objects (e.g., VRUs may be prioritized over non-VRUs), intersect times with the objects (e.g., objects with shorter intersect times may be prioritized over objects with longer intersect times), and/or directions of travel of the objects (e.g., objects appearing to move toward a center of video frames may be prioritized over objects appearing to move away from the center of the video frames).

In some implementations, the collision predictor may construct a collision cone of the vehicle for each video frame of a set of video frames. The collision cone may be an area of the video frame that represents a path in which the vehicle is expected to travel within the environment depicted in the video frame. In some implementations, the collision cone may be constructed to be an area with a fixed shape that is the same for each frame (e.g., a triangle with one side centered at a base of the video frames and the other sides extending toward a center of the video frame). Though constructing a collision cone to have a fixed shape in each video frame may sacrifice a degree of accuracy associated with predicting a collision, using a fixed shape may consume less computing resources and/or enable the collision predictor to more quickly estimate the probability, relative to dynamically constructing a shape of the collision cone. Accordingly, the collision predictor may construct a collision cone to have a fixed shape to provide real-time information associated with the environment and/or a potential collision with an object.

To improve accuracy with respect to determining the probability of a collision with an object, the collision predictor may dynamically construct the collision cone of the vehicle for the video frame by computing an optical flow of the video frame and determining a vanishing point of the video frame. In such a case, the collision predictor can use an optical flow algorithm to compute the optical flow of the video frame. For example, the collision predictor can process the video frame using Farneback's algorithm to compute the optical flow of the video frame. In some implementations, the collision predictor can use a vanishing point algorithm to determine the vanishing point of the video frame. For example, the collision predictor can process the video frame using a random sample consensus (RANSAC) algorithm to determine the vanishing point of the video frame. Although dynamically constructing the collision cone for each frame may improve accuracy, such a process may consume more processing resources of the vehicle environment monitoring device and/or take longer relative to using a fixed shape, and, therefore, may not be used for real-time analysis of the environment.

In some implementations, the collision predictor may utilize a scoring system to determine a score associated with the probability that the vehicle and the object collide based on characteristics of the object, characteristics of the vehicle, and/or characteristics of the camera. Using such a scoring system, the collision predictor can apply weights (z) to parameters corresponding to characteristics of the object (e.g., the direction of travel, the intersect time, the type of the object, the size of the object, the speed of the object, among other characteristics), characteristics of the vehicle (e.g., collision cone, speed, and/or direction of travel), and/or characteristics of the camera (e.g., resolution, frame rate of captured video frames, and/or mounting location on the vehicle). Accordingly, the collision predictor can determine (e.g., via one or more calculations associated with the scoring system) scores for detected and/or identified objects based on the scoring system that are representative of the probabilities of collisions with the objects. For example, the collision predictor can use the following to determine the score (su) based on three characteristics direction (a), intersect time (b), and type (c) of an object (i) for a vehicle (j):

$$s_{ij} = z_{aj}a_i + z_{bj}b_i + z_{cj}c_i + \quad (1)$$

where $z_{aj}$, $z_{bj}$, $z_{cj}$ correspond to adjusted weights based on the relevance to the object (i) for parameters $a_i$, $b_i$, $c_i$ that correspond to the characteristics of the vehicle (j). For example, parameters $a_i$, $b_i$, $c_i$ may include a value (e.g., a characteristic-specific score) associated with a scale for the respective characteristics associated with parameters $a_i$, $b_i$, $c_i$. Additionally, or alternatively, the adjusted weights $z_{aj}$, $z_{bj}$, $z_{cj}$ may be normalized (e.g., where $0 \leq z_{aj}$, $z_{bj}$, $z_{cj} \leq 1$ and $z_{aj} + z_{bj} + z_{cj} = 1$).

In this way, the collision predictor may determine and/or estimate a probability of a collision based on video data received from the camera of the vehicle environment monitoring device.

As further shown in FIG. 1B, and by reference number 140, the event classifier classifies an object-based event associated with the vehicle. For example, the event classifier may classify the object-based event based on a probability of a collision, as determined by the collision predictor and/or a type of the object. The event classifier may classify the object-based event based on a severity of the object-based event with respect to a risk of safety to a VRU and/or the vehicle. For example, an object-based event may be classified as a relatively more dangerous event if the object-based event involves a relatively high probability of a collision with a VRU. On the other hand, an object-based event may be classified as a less dangerous event if the object-based event involves a relatively low probability with a VRU and/or if the object-based event involves a non-VRU.

In some implementations, the event classifier may be configured to classify object-based events (e.g., specific to VRUs) based on characteristics of the environment of the vehicle. For example, the event classifier may be configured to analyze events relative to VRUs based on contextual information obtained from analyzing the video data. More specifically, based on certain types of objects associated with the presence of VRUs (e.g., pedestrian crossings, cycling lanes, buildings, intersections, among other examples) being identified in the environment, the event classifier may activate and/or analyze object-based events specific to VRUs.

In some implementations, as shown, the event classifier may classify the object-based event based on telematics data that is processed by the telematics processor. For example, the telematics data may be referenced and/or utilized to validate and/or improve a probability of a collision, as determined by the collision predictor according to the video data. More specifically, although the vehicle may appear, in some video frames, to be quickly approaching an object (e.g., a VRU) according to the video data and/or that a collision is likely, if the telematics data indicates that the vehicle is moving slowly and/or is stopped, the vehicle environment monitoring device, via the event classifier, may determine that an apparent near collision or probable collision with a VRU, as determined from the video, is not to be classified as a relatively more dangerous event because the vehicle was moving relatively slowly and/or was stopped (indicating that the cause of the apparent near collision or probable collision was caused by the VRU).

In some implementations, as shown in example 100, the vehicle environment monitoring device includes an embedded GPS sensor and/or an inertial motion unit (IMU) (e.g., a gyroscope and accelerometer sensor). The telematics processor may be configured to synchronize telematics data from the GPS sensor and the IMU (e.g., based on timestamps associated with the telematics data and/or sampling rate). Furthermore, the telematics processor may be configured to synchronize the telematics data with the analyzed and/or determined characteristics of the objects determined from the video data of the camera. In some implementations, to account for potential GPS sensor delay, the telematics processor may synchronize GPS sensor data based on an inferred speed of the vehicle from a GPS position signal (e.g., by calculating the distance travelled over time ratio between consecutive samples of GPS sensor data) and/or an estimate of acceleration of the vehicle from the inferred speed (e.g., by computing the speed variation over a time ratio between consecutive samples of the GPS sensor data). Additionally, or alternatively, the telematics processor may determine a delay based on a mean of Fourier transform properties and/or an estimate of Kalman filter parameters. Furthermore, such examples may be used to compensate predictions based on potential effects of the camera being mounted in various positions within the vehicle (e.g., on different locations of the dashboard and/or windshield).

According to some implementations, the event classifier may classify an object-based event according to one or more features of the object (e.g., type, size, location, speed, direction of travel, and/or the like). For example, the event classifier may be configured to identify which objects correspond to VRUs, and/or which VRUs are most susceptible to a collision with the vehicle, based on the features of the VRUs. The trajectories of the VRUs may be interpolated using one or more techniques. For example, the event classifier may determine trajectories based on linear regression residuals associated with centers of bounding boxes associated with the VRUs. Additionally, or alternatively, the event classifier may determine an average angle of motion of a tracked VRU. In such a case, the event classifier can distinguish between an individual crossing a roadway (because the angle indicates that the direction of travel of the VRU is relatively horizontal across the video frames) from an individual walking alongside the roadway (e.g., on a sidewalk) (because the angle indicates that the direction of travel of the VRU is parallel to a direction of travel of the vehicle).

In some implementations, the vehicle environment monitoring device (and/or event classifier) may use a machine learning model to classify object-based events, as described herein. For example, the machine learning model may include and/or utilize one or more of classification parameters associated with classifying a severity of an object-based event associated with one or more detected objects in an environment of the vehicle. The machine learning model may be trained (e.g., by the vehicle environment monitoring device, the vehicle management system, and/or by one or more other platforms associated with the vehicle environment monitoring device and/or vehicle management system) using historical data that is associated with detecting, identifying, and/or classifying events associated with VRUs based on historical values for one or more of the classification parameters. Such classification parameters may include characteristics of the objects, characteristics of the vehicle, characteristics of the environment, among other examples. Using the historical data and values for the one or more classification parameters as inputs to the machine learning model, the vehicle environment monitoring device may classify a severity of an event to alert a driver of danger to a VRU, notify a system of an event involving danger to a VRU, manage information associated with the vehicle and/or the driver based on an event involving danger to a VRU, and/or the like. In some implementations, the vehicle environment monitoring device and/or vehicle management system may retrain the machine learning model by updating the historical data to include validated or invalidated results associated with input values of the one or more classification parameters determined from received video data of the camera (e.g., during use of the vehicle environment monitoring device).

In this way, the event classifier may classify an object-based event associated with an object (e.g., based on a probability of a collision with the object), in particular a VRU, to enable the vehicle environment monitoring device to perform an action associated with the vehicle.

As further shown in FIG. 1B, and by reference number 150, the vehicle environment monitoring device may perform an action based on the classification of the object-based event. For example, the action may be performed based on the determined severity of the event.

According to some implementations, the vehicle environment monitoring device may render an alert that depends on the severity of the event. For example, in the case of a determined likely collision with a VRU, an alarm can be sounded from a speaker, and/or a light can be emitted via a light emitter. Additionally, or alternatively, the alert can be rendered via a display of the vehicle and/or a user device associated with the vehicle environment monitoring device.

In some implementations, the vehicle environment monitoring device may send, via a user interface of the vehicle environment monitoring device, a request for a user to provide a confirmation that the VRU is in the environment. For example, based on detecting a VRU, the vehicle environment monitoring device may prompt a user to verify the presence or the location of the VRU to determine whether the vehicle environment monitoring device accurately identified and/or tracked the VRU. Based on a response to the request from the user, the vehicle environment monitoring device may train and/or retrain one or more of the models (e.g., an object detection model, an object identification model, an object tracking model, and/or the like) that detected, identified, and/or tracked the object.

In some implementations, the vehicle environment monitoring device may provide (e.g., to the vehicle management system) information associated with the vehicle and/or the VRU to log the object-based event and/or indicate the likely collision between the vehicle and the VRU. In this way, users (e.g., a fleet manager associated with the vehicle) of the vehicle management system, and/or drivers involved in dangerous events associated with VRUs, can monitor and/or maintain a history of such events to manage the vehicle and the fleet of vehicles. Implementations described herein may provide drivers with information that can be used to change driving behavior (e.g., by enabling the drivers to recognize and avoid endangering VRUs). Similarly, implementations described herein can allow the fleet managers to create safe driving training materials and/or guidelines, which may prevent or reduce the frequency of endangering VRUs in the future. Preventing or reducing the frequency of endangering VRUs may result in the increased safety of the VRUs, the drivers, the vehicles that the drivers operate, and/or other individuals and property.

In this way, the vehicle environment monitoring device, as described herein, may perform one or more actions, in real-time, that are associated with a driving event involving a VRU to reduce risk to the VRU and/or improve safety with respect to operating a vehicle.

As indicated above, FIGS. 1A and 1B are provided as an example. Other examples may differ from what is described with regard FIGS. 1A and 1B. The number and arrangement of devices shown in FIGS. 1A and 1B are provided as an example. In practice, there may be additional devices, fewer devices, different devices, or differently arranged devices than those shown in FIGS. 1A and 1B. Furthermore, two or more devices shown in FIGS. 1A and 1B may be implemented within a single device, or a single device shown in FIGS. 1A and 1B may be implemented as multiple, distributed devices. Additionally, or alternatively, a set of devices (e.g., one or more devices) shown in FIGS. 1A and 1B may perform one or more functions described as being performed by another set of devices shown in FIGS. 1A and 1B.

Figure 2:
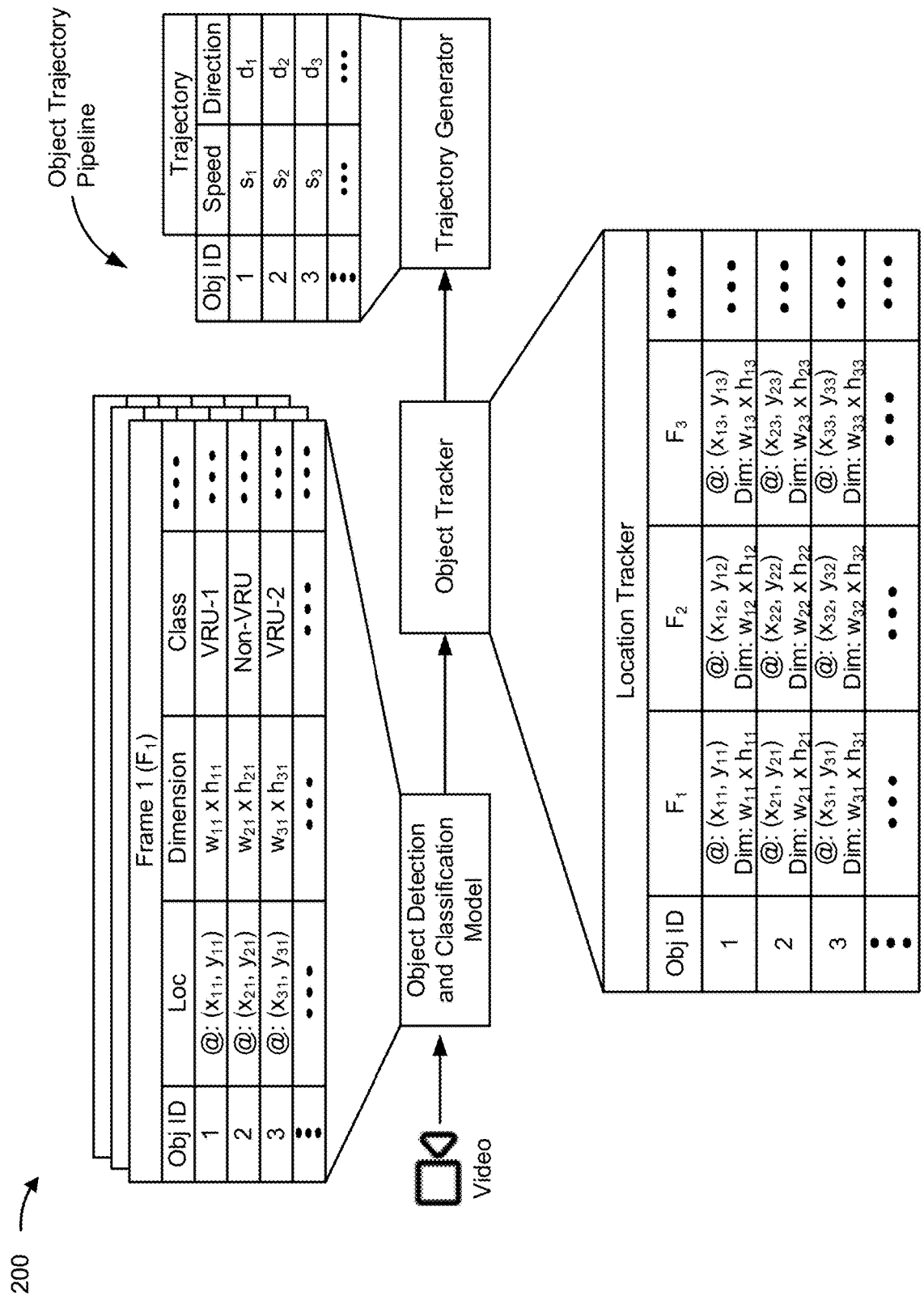
FIG. 2 is a diagram of an example associated with an object trajectory pipeline, as described herein.

FIG. 2 is a diagram of an example 200 associated with detecting a vulnerable road user in an environment of a vehicle. As shown in FIG. 2, example 200 includes an example of the object trajectory pipeline. As shown, the example object trajectory pipeline includes an object detection and classification model, an object tracker, and a trajectory generator.

As shown in example 200, the object detection and classification model may detect and/or identify objects based on locations of the objects, dimensions of the objects, and/or classes (or types) of the objects. The object detection and classification model may analyze the video frames to identify lines depicted in the video frames and generate respective bounding boxes that are associated with respective perimeters of the set of objects. Detected objects are assigned identifiers to enable the object tracker to track the objects. Individual configurations of the objects may be determined based on the bounding boxes. Additionally, or alternatively, the objects may be identified as types of VRUs and/or non-VRUs, based on characteristics of the bounding boxes.

In some implementations, an object identification model of the object detection and classification model, which may use more computing resources than an object detection model of the object detection and classification model, can be processed less frequently to identify a type of an object, while an object detection model can be processed more frequently to track the object, to conserve computing resources consumed by the object identification model while maintaining accuracy with tracking the location of certain types of objects. Accordingly, as an example, if the object trajectory pipeline detects an object and determines that the object is a VRU, the object trajectory pipeline may designate the object (or bounding boxes associated with the object) as a VRU (e.g., assign an identifier to the object) and cause the object detection model to track the object more frequently (e.g., every frame and/or every other frame) to prioritize the safety of the VRU over non-VRUs.

As shown, the object tracker may track the locations of the objects (e.g., centers of the bounding boxes) and/or dimensions of the objects (e.g., dimensions of the bounding boxes). The object tracker can determine the trajectories according to changes in the location and/or dimension of the objects (corresponding to changes in the configuration of the objects across video frames).

The trajectory generator may then determine the trajectory of the objects based on the changing speed of the objects (e.g., increases and/or decreases in sizes of depictions of the objects) and/or direction of movement of the objects.

As indicated above, FIG. 2 is provided as an example. Other examples may differ from what is described with regard to FIG. 2.

Figure 3:
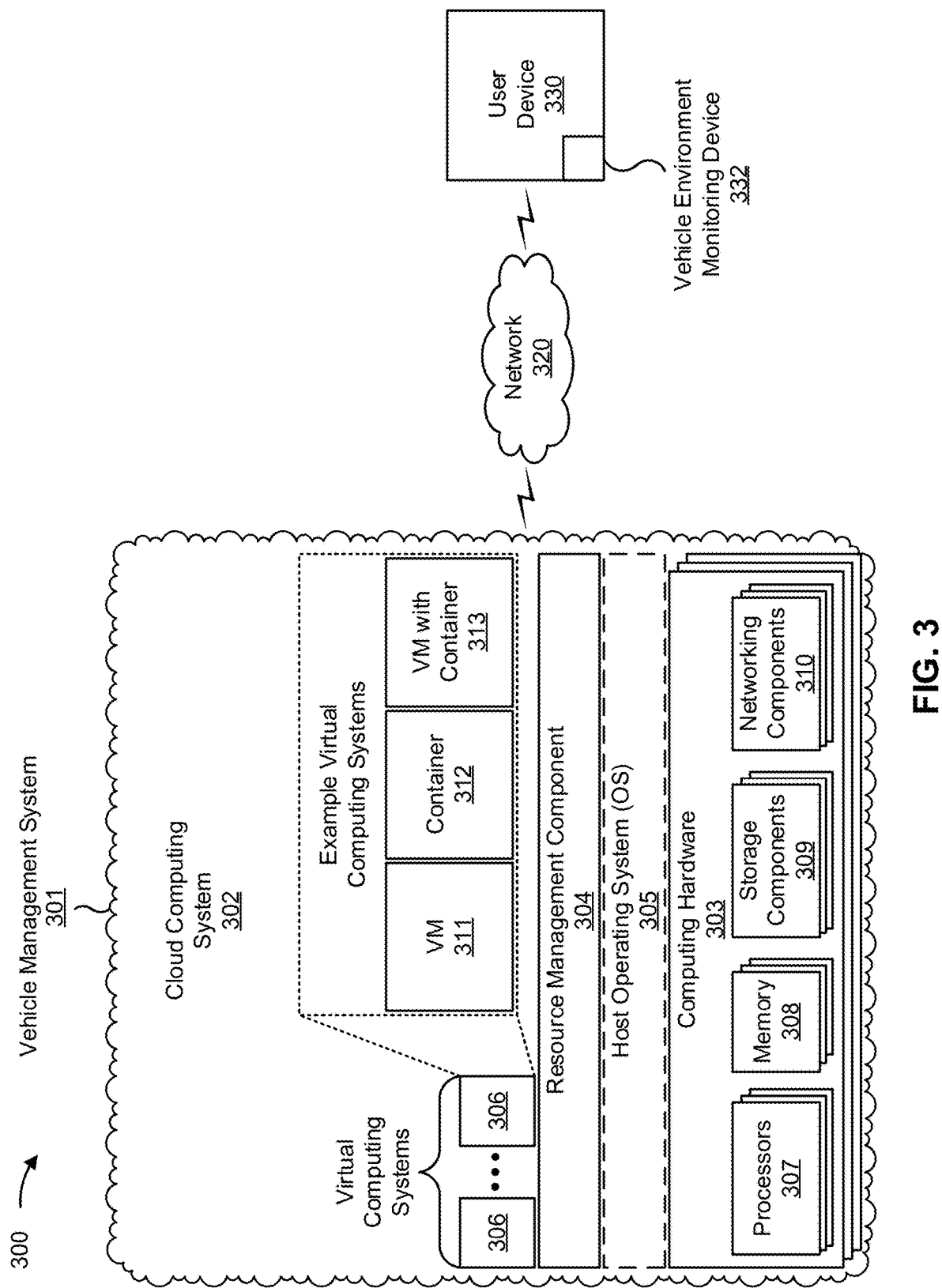
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a vehicle management system 301, which may include one or more elements of and/or may execute within a cloud computing system 302. The cloud computing system 302 may include one or more elements 303-313, as described in more detail below. As further shown in FIG. 3, environment 300 may include a network 320, and a user device 330 with a vehicle environment monitoring device 332 (corresponding to the vehicle environment monitoring device of example 100). Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/ or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the vehicle management system 301 may include one or more elements 303-313 of the cloud computing system 302, may execute within the cloud computing system 302, and/or may be hosted within the cloud computing system 302, in some implementations, the vehicle management system 301 may not be cloud-based (e.g., may be implemented outside of a cloud computing system) or may be partially cloud-based. For example, the vehicle management system 301 may include one or more devices that are not part of the cloud computing system 302, such as device 400 of FIG. 4, which may include a standalone server or another type of computing device. The vehicle management system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

The user device 330 includes one or more devices capable of receiving, generating, storing, processing, and/or providing information associated with detecting a vulnerable road user in an environment of a vehicle, as described elsewhere herein. The user device 330 may include a communication device and/or a computing device. For example, the user device 330 may include a wireless communication device, a user equipment (UE), a mobile phone (e.g., a smart phone or a cell phone, among other examples), a laptop computer, a tablet computer, a handheld computer, a desktop computer, and/or an onboard control system of a vehicle. The user device 330 may communicate with one or more other devices of environment 300, as described elsewhere herein. As shown, the user device includes a vehicle environment monitoring device (e.g., corresponding to the vehicle environment monitoring device of example 100) that may be used to monitor an environment of a vehicle for VRUs, as described herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
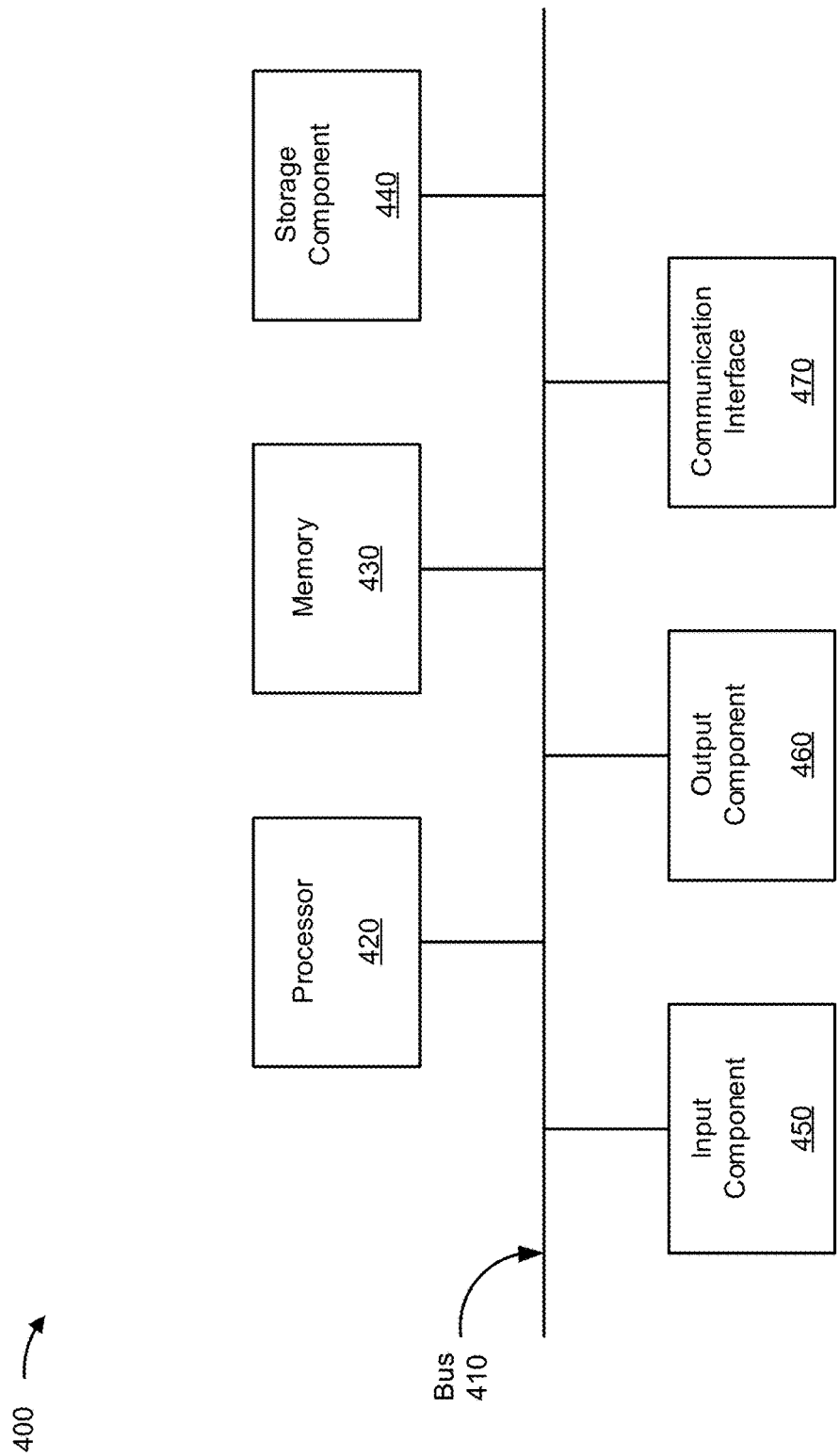
FIG. 4 is a diagram of example components of one or more devices of FIG. 3.

FIG. 4 is a diagram of example components of a device 400, which may correspond to the vehicle management system 301, the user device 330, and/or the vehicle environment monitoring device 332. In some implementations, the vehicle management system 301, the user device 330, and/or the vehicle environment monitoring device 332 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
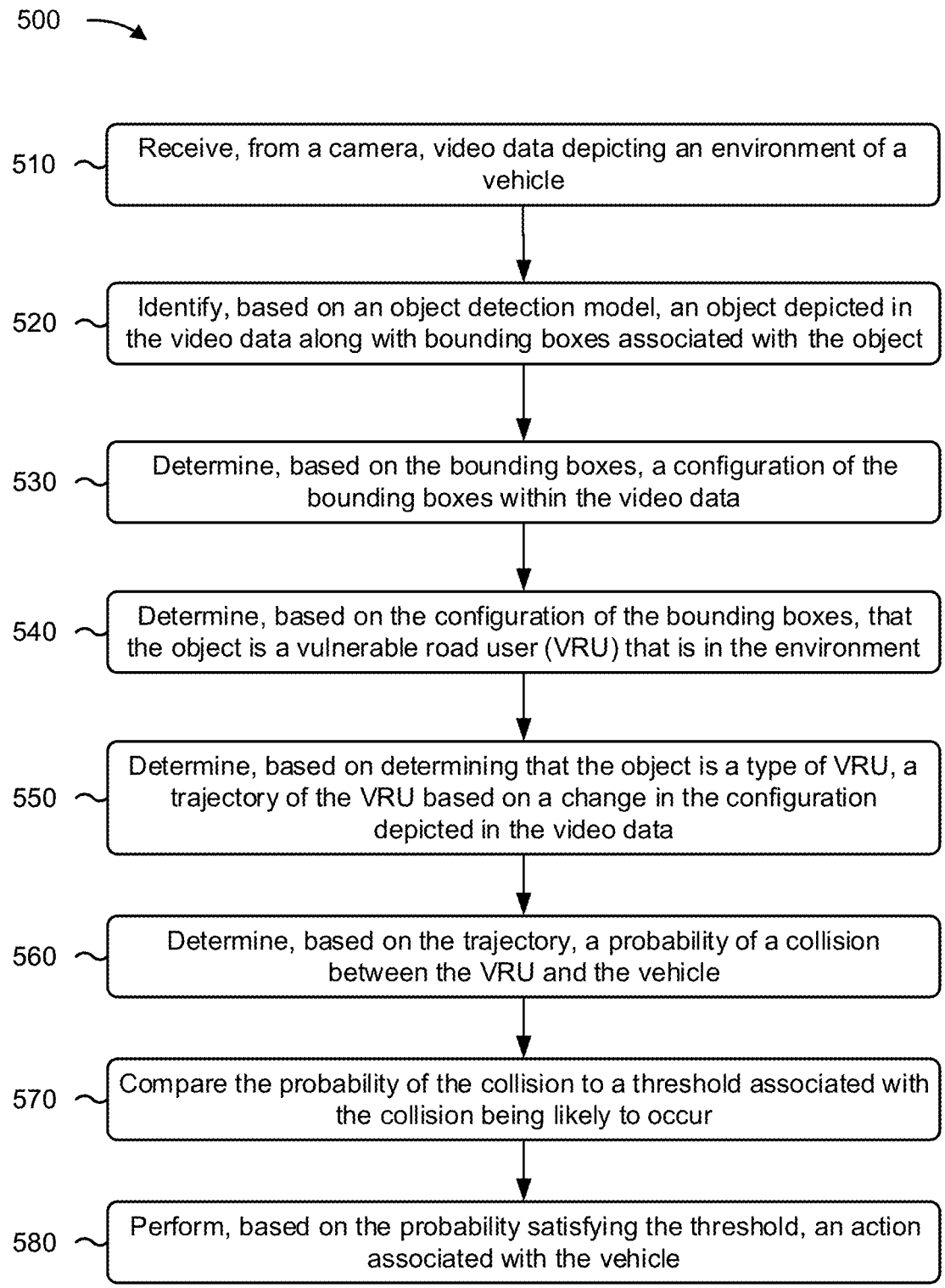
FIG. 5 is a flowchart of an example process relating to detecting a vulnerable road user in an environment of a vehicle.

FIG. 5 is a flowchart of an example process 500 associated with detecting a vulnerable road user in an environment of a vehicle. In some implementations, one or more process blocks of FIG. 5 may be performed by a device (e.g., vehicle environment monitoring device 332). In some implementations, one or more process blocks of FIG. 5 may be performed by another device or a group of devices separate from or including the device, such as a user device (e.g., user device 330) and/or a vehicle management system (e.g., vehicle management system 301). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving, from a camera, video data depicting an environment of a vehicle (block 510). For example, the device may receive, from a camera, video data associated with video frames that depict an environment of a vehicle, as described above. The camera may be mounted to the vehicle.

As further shown in FIG. 5, process 500 may include identifying, based on an object detection model, an object depicted in the video data along with bounding boxes associated with the object (block 520). For example, the device may identify, based on an object detection model, an object depicted in the video frames, as described above. In some implementations, the object detection model indicates bounding boxes associated with the object.

As further shown in FIG. 5, process 500 may include determining, based on the bounding boxes, a configuration of the bounding boxes within the video frames (block 530). For example, the device may determine, based on the bounding boxes, a configuration of the bounding boxes within the video frames, as described above.

As further shown in FIG. 5, process 500 may include determining, based on the configuration of the bounding boxes, that the object is a vulnerable road user (VRU) that is in the environment (block 540). For example, the device may determine, based on the configuration of the bounding boxes, that the object is a VRU that is in the environment, as described above.

An object identification model may be used to analyze the configuration to identify a type of the object. The object identification model may be trained to identify types of objects that are associated with a type of the environment. The vehicle environment monitoring device may determine that the object is the VRU based on the object identification model indicating that the type of the object corresponds to the type of VRU.

As further shown in FIG. 5, process 500 may include determining, based on determining that the object is a type of VRU, a trajectory of the VRU based on a change in the configuration depicted in the video data (block 550). For example, the device may determine, based on determining that the object is a type of VRU, a trajectory of the VRU based on a change in the configuration depicted in the video data, as described above.

In some implementations, determining the trajectory of the VRU may include identifying, in a first video frame of the video data, a first depiction of the configuration, identifying, in a second video frame of the video data, a second depiction of the configuration, and determining the trajectory based on a difference between the first depiction and the second depiction. The difference between the first depiction and the second depiction may correspond to the change in the configuration.

The trajectory may include a direction of movement of the object and a speed of the object. The speed may be determined based on a frame rate of the video data, and the direction of movement may be determined based on a location of the first depiction within the first video frame and a location of the second depiction within the second video frame. Additionally, or alternatively, the direction of movement may be determined based on a size of the first depiction within the first video frame and a size of the second depiction within the second video frame (e.g., increasing size indicates the object is approaching the vehicle and decreasing size indicates the object is moving away from the vehicle).

As further shown in FIG. 5, process 500 may include determining, based on the trajectory, a probability of a collision between the VRU and the vehicle (block 560). For example, the device may determine, based on the trajectory, a probability of a collision between the VRU and the vehicle, as described above. The probability may be determined based on the trajectory, a frame rate of the video data, and/or a timing associated with a potential collision between the vehicle and the VRU.

As further shown in FIG. 5, process 500 may include comparing the probability of the collision to a threshold associated with the collision being likely to occur (block 570). For example, the device may compare the probability of the collision to a threshold associated with the collision being likely to occur, as described above.

As further shown in FIG. 5, process 500 may include performing, based on the probability satisfying the threshold, an action associated with the vehicle (block 580). For example, the device may perform, based on the probability satisfying the threshold, an action associated with the vehicle, as described above.

In some implementations, performing the action comprises at least one of rendering an alert, associated with a likely collision between the vehicle and the VRU, on a display of the vehicle, or providing, to a vehicle management system, information associated with the VRU to log an event associated with the likely collision between the vehicle and the VRU.

In some implementations, the vehicle environment monitoring device may determine whether the probability satisfies a threshold associated with the VRU and the vehicle likely colliding. The action may be performed based on whether the probability satisfies the threshold.

Process 500 may include additional implementations, such as any single implementation or any combination of implementations described below and/or in connection with one or more other processes described elsewhere herein.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a device and from a camera, video data depicting an environment of a vehicle;
    identifying, by the device and in the video data, an object and bounding boxes associated with the object;
    determining, by the device, a configuration of the bounding boxes based on at least one of one or more sizes of the bounding boxes, one or more shapes of the bounding boxes, one or more locations of the bounding boxes, or one or more relationships between the bounding boxes;
    comparing the configuration of the bounding boxes to stored configurations mapped to different objects including a vulnerable road user (VRU);
    determining, by the device and based on comparing the configuration of the bounding boxes, that the object is the VRU;
    determining, by the device and based on determining that the object is the VRU, a trajectory of the VRU based on a change in the configuration of the bounding boxes;
    determining, by the device and based on the trajectory, a probability of a potential collision between the VRU and the vehicle;
    comparing, by the device, the probability of the potential collision to a threshold associated with the potential collision being likely to occur; and
    performing, by the device and based on the probability satisfying the threshold, an action associated with the vehicle.

2. The method of claim 1, wherein the camera is mounted to the vehicle.

3. The method of claim 1, wherein determining that the object is the VRU comprises:
    causing an object identification model to analyze the configuration of the bounding boxes to identify a type of the object, wherein the object identification model is trained to identify types of objects that are associated with a type of the environment; and
    determining that the object is the VRU based on the object identification model indicating that the type of the object corresponds to the type of VRU.

4. The method of claim 1, wherein determining the trajectory of the VRU comprises:
    identifying, in a first video frame of the video data, a first depiction of the configuration of the bounding boxes;
    identifying, in a second video frame of the video data, a second depiction of the configuration of the bounding boxes; and
    determining the trajectory based on a difference between the first depiction and the second depiction, wherein the difference between the first depiction and the second depiction corresponds to the change in at least one of a size or a location of the configuration of the bounding boxes in the second depiction from the configuration of the bounding boxes in the first depiction.

5. The method of claim 4, wherein the trajectory includes a direction of movement of the object and a speed of the object, wherein the speed is determined based on a frame rate of the video data, and wherein the direction of movement is determined based on at least one of:
    a location of the first depiction within the first video frame and a location of the second depiction within the second video frame, or a size of the first depiction within the first video frame and a size of the second depiction within the second video frame.

6. The method of claim 1, wherein determining the probability comprises:
    determining, based on the trajectory and a frame rate of the video data, timing associated with the potential collision between the vehicle and the VRU; and
    determining the probability based on the timing.

7. The method of claim 1, further comprising:
    prior to performing the action, determining whether the probability satisfies a threshold associated with the VRU and the vehicle likely colliding; and
    performing the action based on whether the probability satisfies the threshold.

8. The method of claim 1, wherein performing the action comprises at least one of:
    rendering an alert, associated with the potential collision between the vehicle and the VRU, on a display of the vehicle; or providing, to a vehicle management system, information associated with the VRU to log an event associated with the potential collision between the vehicle and the VRU.

9. A device, comprising:
one or more processors configured to:
receive video data associated with video frames that depict an environment of a vehicle;
identify, based on an object detection model and in the video frames, a set of objects and bounding boxes associated with the set of objects;
determine a configuration of respective bounding boxes, of the bounding boxes and associated with an object of the set of objects, based on at least one of one or more sizes of the respective bounding boxes, one or more shapes of the respective bounding boxes, one or more locations of the respective bounding boxes, or one or more relationships between the respective bounding boxes;
compare the configuration of the respective bounding boxes to stored configurations mapped to different objects including a vulnerable road user (VRU);
determine, based on comparing the configuration of the respective bounding boxes, that the object corresponds to the VRU;
determine, based on determining that the object corresponds to the VRU and further based on a change in the configuration, of the respective bounding boxes, a trajectory of the VRU;
determine, based on the trajectory, a probability of a potential collision between the VRU and the vehicle; and
perform, based on the probability, an action associated with alerting a user that the VRU may collide with the vehicle.

10. The device of claim 9, wherein the object detection model is configured to identify the set of objects by:
analyzing the video frames to identify lines depicted in the video frames; and
generating, based on arrangements of the lines, the bounding boxes, wherein the bounding boxes and the set of objects are identified based on generating the bounding boxes.

11. The device of claim 9, wherein the stored configurations are in an object identification data structure.

12. The device of claim 9, wherein the one or more processors, when determining the trajectory, are configured to:
determine a speed of the object based on a frame rate of the set of the video frames; and determine a direction of movement of the object based on the change in the configuration of the respective bounding boxes, wherein the change in the configuration of the respective bounding boxes corresponds to at least one of:
a change in a location of the object depicted in the set of the video frames, or
a change in a size of the object depicted in the set of the video frames, and wherein the trajectory includes the speed of the object and the direction of movement of the object.

13. The device of claim 9, wherein the one or more processors, when determining the probability, are configured to:

determine, based on the trajectory and a frame rate of the set of the video frames, timing associated with the potential collision between the vehicle and the VRU; and
determine the probability based on the timing.

14. A non-transitory computer-readable medium storing a set of instructions, the set of instructions comprising:
one or more instructions that, when executed by one or more processors of a device, cause the device to:
obtain video data associated with video frames that depict an environment of a vehicle; identify, based on the video data and in the video frames, a set of objects and respective bounding boxes associated with the set of objects;
determine a configuration of respective bounding boxes, of the bounding boxes and associated with an object of the set of objects, based on at least one of one or more sizes of the respective bounding boxes, one or more shapes of the respective bounding boxes, one or more locations of the respective bounding boxes, or one or more relationships between the respective bounding boxes;
compare the configuration of the respective bounding boxes to stored configurations mapped to different objects including a vulnerable road user (VRU);
determine, based on comparing the configuration of the respective bounding boxes, that the object corresponds to the VRU;
determine a trajectory of the VRU based on determining that the object corresponds to the VRU and further based on a change in the configuration of the respective bounding boxes, wherein the trajectory includes a direction of movement;
determine a probability of a potential collision between the VRU and the vehicle based on the direction of movement and a frame rate of the set of the video frames; and
perform, based on the probability, an action associated with the vehicle.

15. The non-transitory computer-readable medium of claim 14, wherein the stored configurations are in an object identification data structure.

16. The non-transitory computer-readable medium of claim 14, wherein the one or more instructions, that cause the device to determine the trajectory of the VRU, cause the device to:
identify, in a first video frame of the set of the video frames, a first depiction of the configuration of the respective bounding boxes;
identify, in a second video frame of the set of the video frames, a second depiction of the configuration of the respective bounding boxes; and
determine the trajectory based on a difference between the first depiction and the second depiction, wherein the difference between the first depiction and the second depiction corresponds to the change in the configuration of the respective bounding boxes.

17. The non-transitory computer-readable medium of claim 14, wherein the trajectory includes a speed of the object, wherein the speed is determined based on at least one of:
the frame rate of the set of the video frames, or
a change in location of the object within the set of the video frames, or
a change in size of the object within the set of the video frames.

18. The non-transitory computer-readable medium of claim 14, wherein the one or more instructions further cause the device to:
prior to performing the action, determining whether the probability satisfies a threshold associated with the VRU and the vehicle likely colliding; and
performing the action based on whether the probability satisfies the threshold.

19. The non-transitory computer-readable medium of claim 14, wherein the one or more instructions, that cause the device to perform the action, cause the device to:
render an alert, associated with the VRU, on a display of the vehicle to indicate to a user of the vehicle that the VRU is in the environment;
send, via a user interface of the vehicle, a request for a confirmation, from the user, that the VRU is in the environment;
train, based on a response to the request, an object detection model that identified the set of objects; or
provide, to a vehicle management system, information associated with the VRU to log an event associated with the vehicle and the VRU.

20. The method of claim 6, wherein the timing associated with the potential collision between the vehicle and the VRU is further based on a rate at which the VRU changes size in the video frames.

* * * * *